United States Patent
Lynch et al.

(10) Patent No.: US 7,318,347 B2
(45) Date of Patent: Jan. 15, 2008

(54) HEMISPHERICAL RESONATOR GYRO CONTROL

(75) Inventors: David D. Lynch, Santa Barbara, CA (US); Ryan R. Savava, Camarillo, CA (US); James J. Campanile, Oak Park, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 235 days.

(21) Appl. No.: 11/125,024

(22) Filed: May 9, 2005

(65) Prior Publication Data

US 2006/0248953 A1 Nov. 9, 2006

(51) Int. Cl.
*G01P 9/04* (2006.01)
(52) U.S. Cl. .................................. 73/504.13
(58) Field of Classification Search .............. 73/504.13, 73/504.12, 504.04, 1.37
See application file for complete search history.

(56) References Cited

U.S. PATENT DOCUMENTS

| | | | | |
|---|---|---|---|---|
| 4,157,041 A | * | 6/1979 | Loper et al. | 73/504.13 |
| 4,951,508 A | * | 8/1990 | Loper et al. | 73/504.13 |
| 5,712,427 A | * | 1/1998 | Matthews | 73/504.04 |
| 5,983,719 A | * | 11/1999 | Matthews et al. | 73/504.13 |
| 6,357,296 B1 | * | 3/2002 | Baker et al. | 73/504.13 |

* cited by examiner

*Primary Examiner*—Helen C. Kwok
(74) *Attorney, Agent, or Firm*—Carmen B. Patti & Assoc., LLC (57) ABSTRACT

Embodiments of the present system encompass: a hemispherical resonator gyro (HRG); digital control loop algorithms which operate in two, distinct modes, Force to Rebalance (FTR) and Whole Angle (WA); and a closed-loop slewing-voltage phase control that reduces quadrature error when the hemispherical resonator gyro transitions from WA to FTR.

14 Claims, 6 Drawing Sheets

```
┌─────────────────────────────────────────┐
│ DEVELOPING A STANDING WAVE ON A QUARTZ SHELL │
│   OF A HRG WITH A HIGH Q RESONANT MODE  │
│                   601                   │
└─────────────────────────────────────────┘
                    │
                    ▼
┌─────────────────────────────────────────┐
│ ALLOWING, IN OPEN LOOP OPERATION (WHOLE ANGLE │
│  MODE), THE STANDING WAVE TO PRECESS FREELY  │
│                   602                   │
└─────────────────────────────────────────┘
                    │
                    ▼
┌─────────────────────────────────────────┐
│   RECOVERING REBALANCE OPERATION WHEN RATE   │
│    DRIVE SLEWS THE STANDING WAVE PATTERN     │
│                   603                   │
└─────────────────────────────────────────┘
                    │
                    ▼
┌─────────────────────────────────────────┐
│  HOLDING, IN CLOSED LOOP OPERATION (FORCE TO │
│ REBALANCE), THE STANDING WAVE TO NULL POSITION │
│                   604                   │
└─────────────────────────────────────────┘
```

HEMISPHERICAL RESONATOR GYRO CONTROL

TECHNICAL FIELD

The invention relates generally to control of gyros, and in particular to control of a Hemispherical Resonator Gyro (HRG).

BACKGROUND

Known legacy inertial reference unit products may employ a Hemispherical Resonator Gyro (HRG), and use digital control loop algorithms, which operate in two, distinct modes: Force to Rebalance (FTR) and Whole Angle (WA). The former mode provides the highest performance angular rate data by caging the HRG resonant standing wave by rebalancing it with electrical force. FTR mode is only effective over a limited angular rate range. The latter mode allows the standing wave to precess with inertial motion, but yields lesser performance. It is effective over a large angular rate range, and is the reversionary mode of operation once the FTR authority range has been exceeded.

Amplitude, phase lock and quadrature control are essential for generating and maintaining the standing wave in either WA or FTR modes. The operation/interaction is as follows: the phase lock loop is a feedback loop, which detects and converges on the unique resonant frequency and phase of the gyro. The output of this control loop generates a specific frequency control to the digital signal processing which maintains the correct rate and phase of the nodal and antinodal sampling. It also is essential for the active controls (rate, and amplitude) to apply their respective outputs with the correct phase offset. In FTR mode, the rate drive is applied with an optimized phase correction, which remains essentially fixed. This optimized value ensures minimal rate energy is introduced into the quadrature. In the case of the forced rotation of the standing wave, as occurs when the rate drive slews the pattern to recover rebalance operation (WA to FTR transition), this rate phase relationship is no longer fixed and large quadrature errors are introduced. These errors are beyond the authority of the standard quadrature control function to null.

Thus, there is a need for an improved hemispherical resonator gyro and, in particular, for improved compensation regarding the above-identified error.

SUMMARY

The invention in one implementation encompasses an apparatus. The apparatus comprises a hemispherical resonator gyro (HRG); digital control loop algorithms which operate in two, distinct modes, Force to Rebalance (FTR) and Whole Angle (WA); and a closed-loop slewing-voltage phase control that reduces quadrature error when the hemispherical resonator gyro transitions from WA to FTR.

Another implementation of the invention encompasses a method. The method comprises: developing a standing wave on a quartz shell of a HRG with a high Q resonant mode; allowing, in open loop operation (Whole Angle Mode), the standing wave to precess freely; recovering rebalance operation when rate drive slews the standing wave pattern; and holding, in closed loop operation (Force to Rebalance), the standing wave to null position.

DESCRIPTION OF THE DRAWINGS

Features of exemplary implementations of the invention will become apparent from the description, the claims, and the accompanying drawings in which:

DETAILED DESCRIPTION

Figure 1:
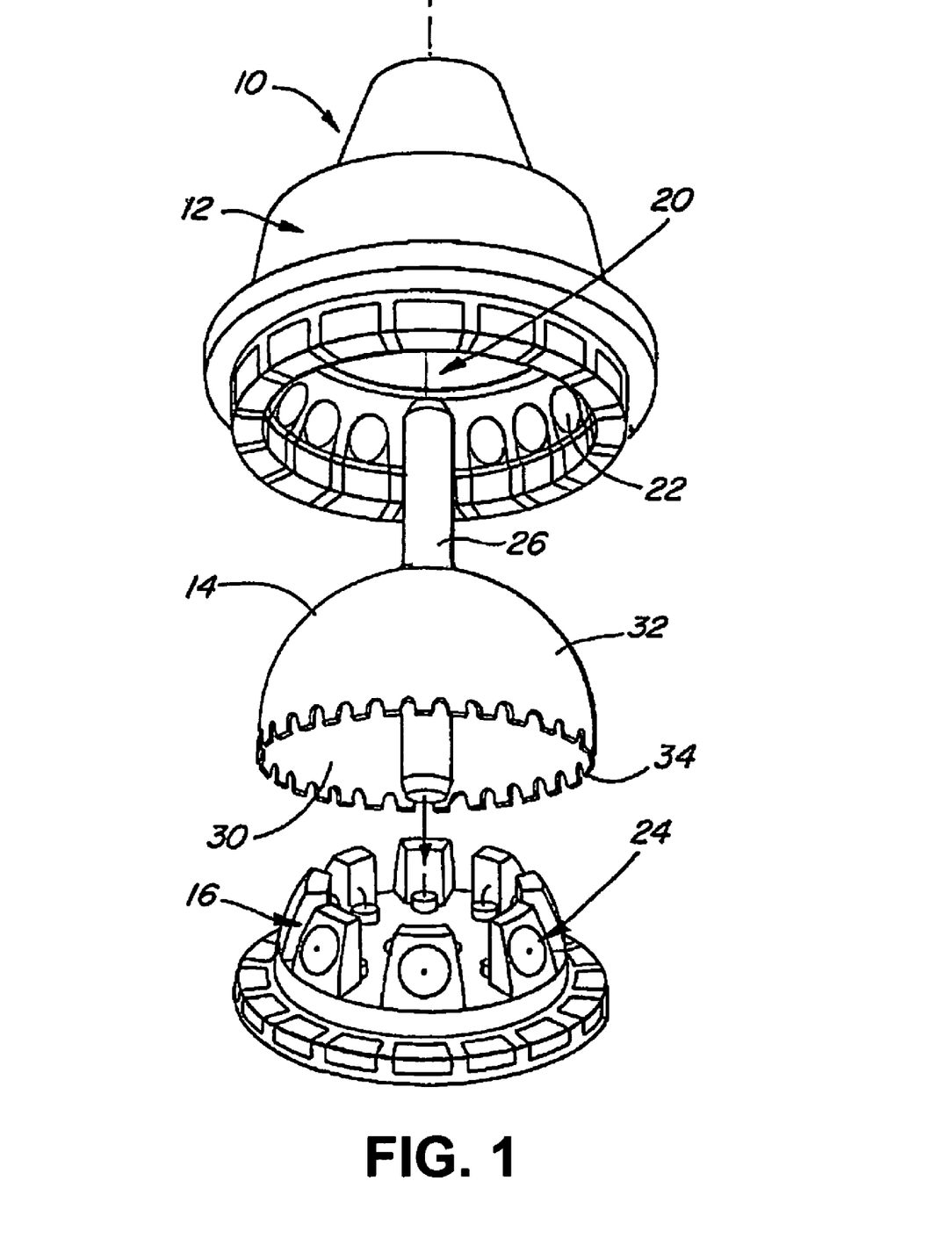
FIG. 1 depicts a hemispherical resonator gyro for use with the present control system.

FIG. 1 depicts a hemispherical resonator gyro (HRG) 10 for use with the present control system. The HRG 10 may have a number of electrodes 20 and 22 that are metalized on the inside surface of the outer housing 12, which is concentric with the hemispherical shell resonator 14. The electrodes 20 and 22 in the outer housing 12 together with the surface of the resonator form a series of forcing electrostatic capacitors. Voltage is applied to combinations of the electrodes 20 and 22 to control the amplitude of the standing wave and to suppress unwanted quadrature effects.

The HRG 10 may be rotated about an axis normal to the plane of the rim 34 of shell resonator 14. This rotation causes the standing wave to rotate in the opposite direction with respect to the HRG 10 by an angle proportional to the angle of rotation of the HRG 10. Thus, by measuring the angle of rotation of the standing wave with respect to the HRG 10, the angle of rotation of the HRG 10 may be determined.

The vibrational mode of the shell resonator 14 may be excited by placing a DC bias voltage on the resonator and an AC voltage on the ring forcing electrode 20. The frequency of the AC voltage is twice the resonant frequency of the hemispherical shell resonator 14.

Signals from the HRG 10 contain information about the amplitude and location of the standing wave on the shell resonator 14. These signals may be obtained capacitively. Capacitor electrodes 24 are formed by metalized interior surface 30 of the shell resonator 14 and a plurality of electrodes 24 which are located on an inner concentric housing held in close proximity to the inner metalized shell resonator 14. Because of the shell's oscillating deformation the capacitance of each of the electrodes 24 is modulated at the resonator flexing frequency. Electronic circuits, for example, may be used to measure these capacitance changes from which the location and amplitude of the standing wave may be determined.

It is to be noted that the example depicted in FIG. 1 is only one of many different configurations. For example, a common electrode structure may replace the 16 discrete electrodes (22) and the ring electrode (20) by 32 discrete electrodes located approximately where the 16 electrodes are located in FIG. 1. Every other electrode of the 32 electrodes (for example, the odd-numbered ones) perform the same function as the 16 electrodes in FIG. 1. The other 16 electrodes (for example, the even-numbered ones) are connected together and essentially simulate a single ring electrode (that is, they play the role of the ring electrode in FIG. 1).

Figure 2:
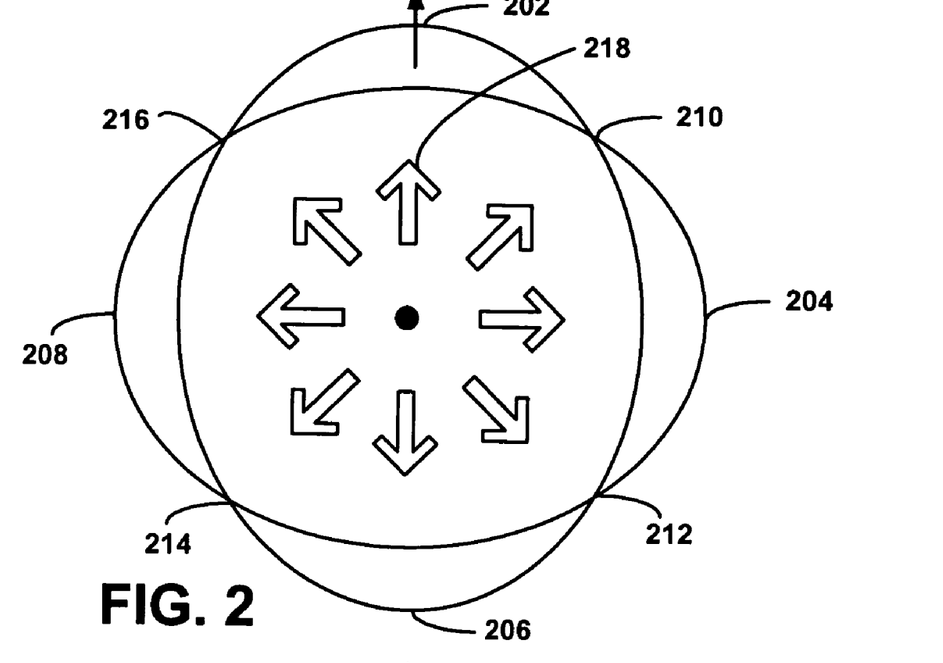
FIGS. 2 and 3 depict standing wave patterns of the FIG. 1 HRG.
Figure 3:
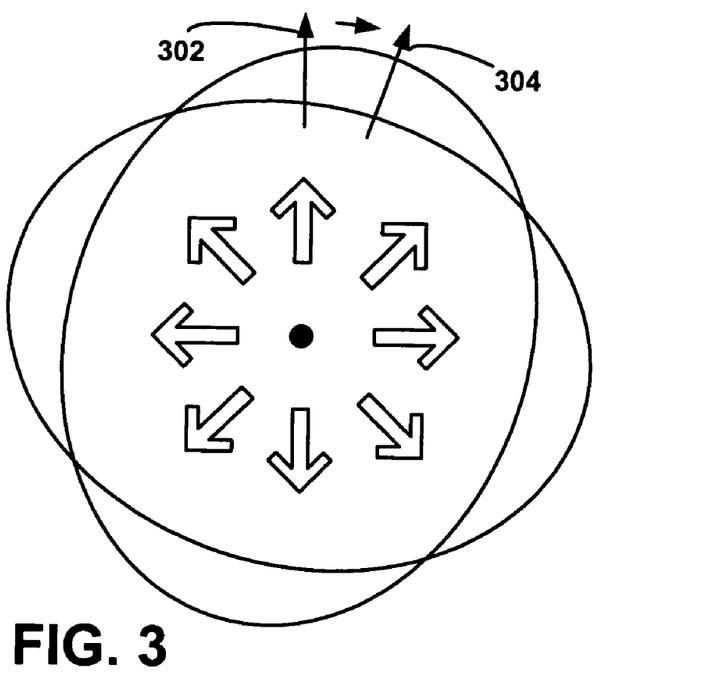

FIGS. 2 and 3 depict standing wave patterns of the FIG. 1 HRG 10. The standing-wave patterns shown in FIGS. 2 and 3 are only two out of an infinite number of possible standing-wave patterns.

In FIG. 2 the standing wave pattern has four lobes 202, 204, 206, 208 and four nodes 210, 212, 214, 216. Also depicted are electrodes 218.

In FIG. 3 there is a rotation of the HRG that causes the standing wave pattern to move from initial position 302 to new position 304.

In a HRG a standing wave is developed on a quartz shell with a high Q resonant mode. In open loop operation (Whole Angle Mode), the standing wave precesses a freely measured angle. In closed loop operation, the standing wave is held to null position, measured rate proportional to volts applied to the rate drive pads. This is a limited dynamic range application and is a force-rebalance mechanization.

The resonator is manufactured with tight tolerances for mechanical balance and material purity. However, small imperfections in the resonator and vacuum (the resonator is in a hermetically sealed enclosure) create damping and frequency errors (amplitude and quadrature degradation) in the standing wave. These errors degrade performance of the end product (angle/angle rate) and must be controlled by signal processing and feedback control loops.

Figure 4:
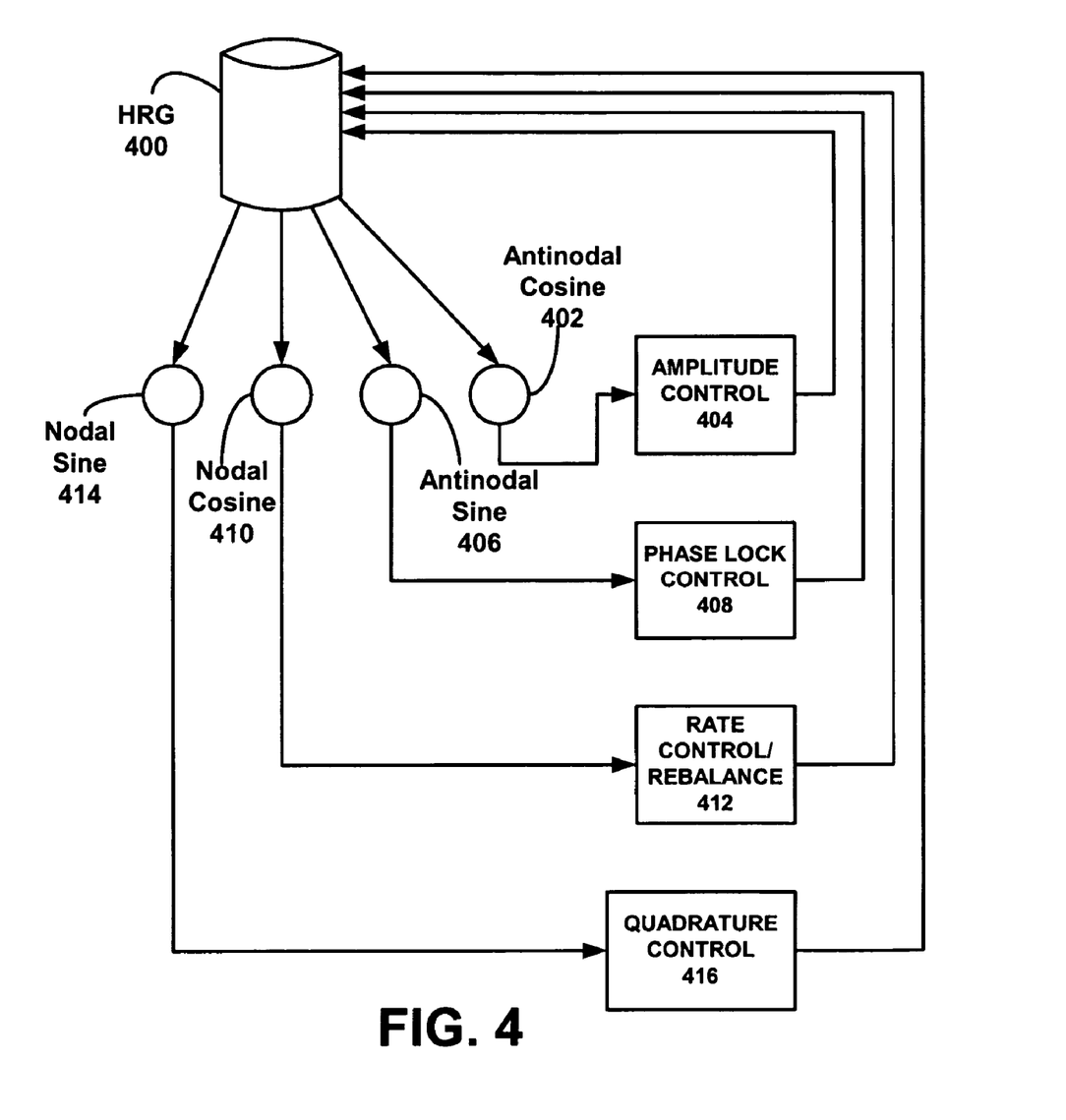
FIG. 4 depicts control loops for controlling the FIG. 1 HRG.

FIG. 4 depicts control loops for controlling the FIG. 1 HRG 400.

Before going into the basic description of the control loops, it is necessary to elaborate the previous discussion of the possible standing waves that can exist on the quartz shell of an HRG. FIGS. 2 and 3 show two possible standing waves. For the small amplitudes of shell deformation employed in the HRG, the point-by-point addition (superposition) of the displacements of the shell corresponding to the standing waves of FIGS. 2 and 3 also gives a "standing" wave. Standing is put in parenthesis here because the result of the superposition of the standing waves of FIGS. 2 and 3 is a true standing wave only if the FIG. 2 and FIG. 3 standing waves are exactly in phase.

When the standing waves of FIGS. 2 and 3 are exactly in phase (and in the special case in which they are of equal amplitude), the result of superposing them is a similar standing wave whose lobes (antinodes) and nodes are midway between the antinodes and nodes of FIGS. 2 and 3. (For example, with reference to FIG. 3, the antinode of the resultant standing wave near the top of the figure would be midway between 302 and 304.) The most general wave (of the type being considered) that can exist on the quartz shell of an HRG consists of the superposition of two standing waves oscillating exactly 90° out of phase, the nodes of the second lying exactly opposite the antinodes of the first (i.e., the system of antinodes and nodes of the second being displaced 45° with respect to the system of antinodes and nodes of the first).

The control problem of the HRG may now be simply stated as that of maintaining one of the waves (the principal standing wave or antinodal wave) at a prescribed amplitude and driving the other wave (the secondary standing wave or nodal-quadrature wave) to null. When this control is accomplished, the standing wave takes the simple form of FIGS. 2 or 3. In force-rebalance mode, additional forces are developed to maintain the standing wave in a fixed location such as that shown in FIG. 2.

The first step in implementing these controls is processing the outputs of the readout electrodes to provide signals proportional to the oscillating amplitudes of the principal (antinodal) wave and the nodal-quadrature wave. In force-rebalance operation, the readout signals themselves provide the desired signals because the readout electrodes lie directly over the antinodes and nodes of the antinodal and nodal-quadrature waves. Obtaining the desired signals is somewhat more complex in the whole-angle mode of operation but it is straightforward. It is described in detail in U.S. Pat. No. 4,951,508 granted Aug. 28, 1990 to Edward J. Loper, Jr. and David D. Lynch.

The antinodal and nodal-quadrature signals are demodulated with respect to the signals from a reference oscillator to provide outputs that are proportional to their oscillatory components that are in phase (Antinodal Cosine and Nodal Cosine) and in quadrature (Antinodal Sine and Nodal Sine) with the reference oscillator. The frequency and phase of the reference oscillator is controlled by a phase lock loop that adjusts the (frequency and) phase so as to drive the Antinodal Sine output signal to zero. This basically locks the reference oscillator to the frequency and phase of the principal (antinodal) wave. The Antinodal Cosine signal then provides a measure of the amplitude of the principal wave and can be used as the control variable in the amplitude-control loop used to maintain the amplitude at a prescribed value.

With the phase lock loop maintaining the phase of the reference oscillator equal to the antinodal-wave phase, the Nodal Sine signal is proportional to the amplitude of the nodal quadrature wave. It can therefore be used as the control variable in the closed loop that drives the amplitude of the nodal-quadrature wave to null, thus insuring that the principal wave is a pure standing wave.

Force-rebalance operation is achieved by exerting forces of the correct phase at the standing wave nodes so as to null the Nodal Cosine signal. The amplitude of the force required is related to the HRG rotation rate that is attempting to rotate the standing wave and thus create a non-zero Nodal Cosine signal. As mentioned earlier, in force-rebalance operation, the readout electrodes define the location of the antinodes and nodes of the two waves and therefore the demodulated readout-electrode outputs can be used directly as the control variables in the various loops without further processing.

The following table succinctly summarizes the above discussion.

| Description | Control Loop |
|---|---|
| Antinodal Cosine (AnCos) 402 | Amplitude Control 404 |
| Antinodal Sine (AnSin) 406 | Phase lock 408 |
| Nodal Cosine (NdCos) 410 | Rate Control/Rebalance loop 412 |
| Nodal Sine (NdSin) 414 | Quadrature Control 416 |

As previously explained above, amplitude control 404, phase lock 408 and quadrature control 416 are essential for generating and maintaining the standing wave in either WA or FTR modes. The phase lock loop is a feedback loop, which detects and converges on the unique resonant frequency and phase of the HRG. The output of this control loop generates a specific frequency control to digital signal processing, which maintains the correct rate and phase of the nodal and antinodal sampling. It also is essential for the active controls (rate, and amplitude) to apply their respective outputs with the correct phase offset.

As stated above, in FTR mode, the rate drive is applied with an optimized phase correction, which remains essentially fixed. This optimized value ensures minimal rate energy is introduced into the quadrature. In the case of the forced rotation of the standing wave, as occurs when the rate drive slews the pattern to recover rebalance operation (WA to FTR transition), this rate phase relationship is no longer fixed and large quadrature errors are introduced. Embodiments of the present system compensate for these errors.

In current practice, errors in the rate command phase are corrected with the use of an open-loop compensation model (as a function of pattern angle) when the rate drive slews the pattern to recover rebalance operation (WA to FTR transition). In the current apparatus and method, rate command phase error is minimized by dynamic closed-loop control. The output of the closed-loop control (e.g., software command PCLCmd—see Equation 1) may be used to estimate the optimal rate phase value to be applied by an open-loop compensation model. This model may be used in the current-practice device to insure its best performance. The open-loop model can also be used in conjunction with closed-loop control. The closed-loop slewing-voltage phase control will then only be required to correct the errors in the open-loop compensation model thereby easing the loop requirements.

Figure 5:
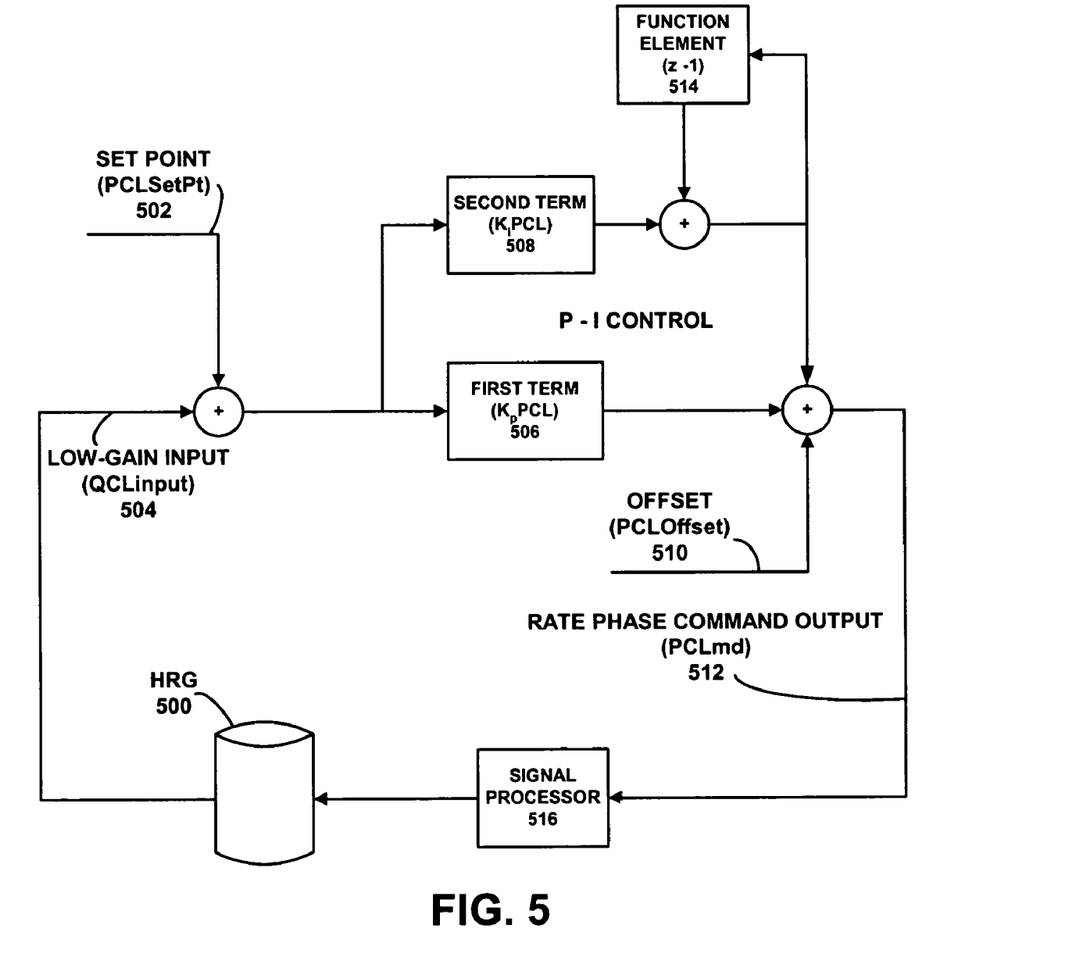
FIG. 5 depicts a rate control/rebalance loop for controlling the FIG. 1 HRG.

FIG. 5 is a functional block-diagram of the phase control loop and depicts a rate control/rebalance loop for controlling a HRG 500. A set point 502 (e.g. software command PCLSetPt) may be summed with a low gain input 504 (e.g. software command QCLinput) from the HRG 500. This result may then be provided to a first term 506 (e.g. software function KpPCL) and to a second term 508 (e.g. software element KiPCL). An output of the first element 506 may be combined with an offset value (e.g. software command PCLOffset) 510, and with a result of the second term 508 and a feedback loop with a function element (e.g. software element z-1) 514. The final result may be a rate phase command output 512 (e.g. software command PCLmd).

The software command PCLmd may be applied to the HRG 500 via a signal processor 516.

The resultant loop control command, PCLmd, may be used to calibrate an open loop model for rate phase command generation. An offset (e.g. software command PCLOffset) and sine/cosine(2*EA) (e.g. software commands PCLSin2C/PCLCos2C) model may be used. Calibration of PCLOffset, PCLSin2C and PCLCos2C make this a phase compensation open-loop in normal operation, with resonator temperature dependency compensated by the output of the phase locked loop (e.g. software command QCPCmd). The PCL command may be generated in units of clock-counts of offset as written to pulse-width modulation code generation hardware. The detailed mode logic and loop equations (in pseudo-code form) are provided in Equation (1).

---
Equation 1: Phase control loop algorithm
---
```
if ( (WA to FTR transition) and (PCL Calibration Mode Enabled) )
PCLErr = sign(Rate Drive Command)*QCLInput
PCLInt = PCLInt + KiPCL*PCLErr
PCLCmd = KpPCL*PCLErr + PCLInt +
    sign(Rate Drive Command)
    *(PCLSinC2*Sin(2*EA)+PCLCosC2*Cos(2*EA)) +
    (QCPCmd − (Nominal QCPCmd) ) + PCLOffset
else if ( WA to FTR transition )
PCLCmd = sign(Rate Drive Command)
    *(PCLSinC2*Sin(2*EA)+PCLCosC2*Cos(2*EA)) +
    (QCPCmd − (Nominal QCPCmd) ) + PCLOffset
else
PCLCmd = PCLOpenCmd + PCLOffset
PCLInt = 0
end
```

Figure 6:
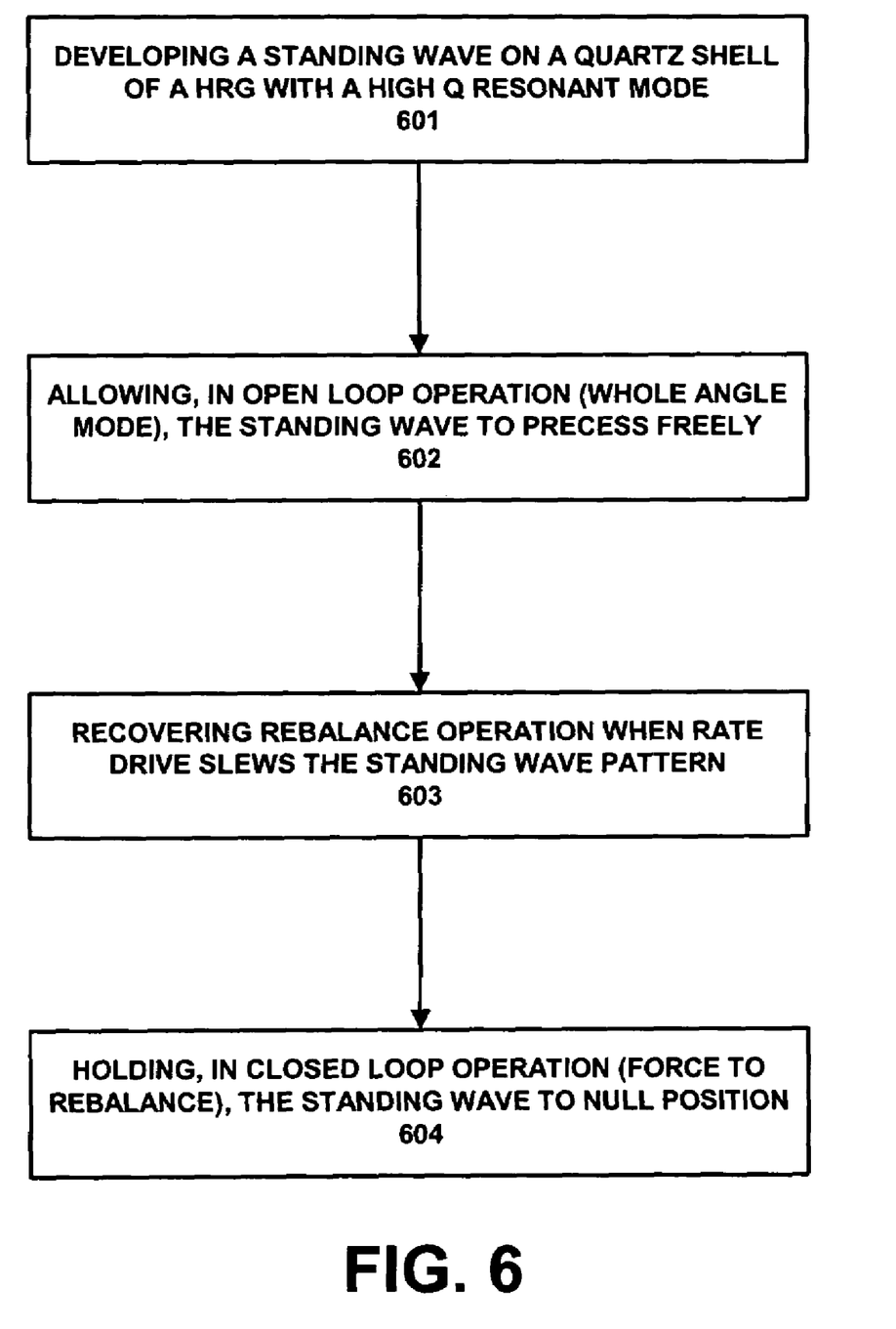
FIG. 6 depicts a block diagram of the present method.

FIG. 6 depicts a block diagram of the present method.

An embodiment of the present method may have the steps of: developing a standing wave on a quartz shell of a HRG with a high Q resonant mode (601); allowing, in open loop operation (Whole Angle Mode), the standing wave to precess freely (602); recovering rebalance operation when rate drive slews the standing wave pattern (603); and holding, in closed loop operation (Force to Rebalance), the standing wave to null position (604).

Figure 7:
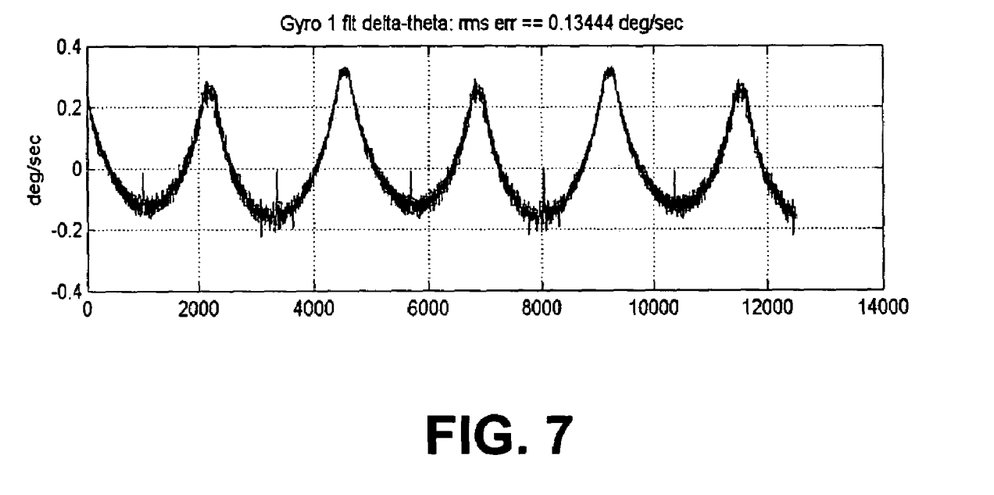
FIG. 7 depicts residual rate change without compensation.
Figure 8:
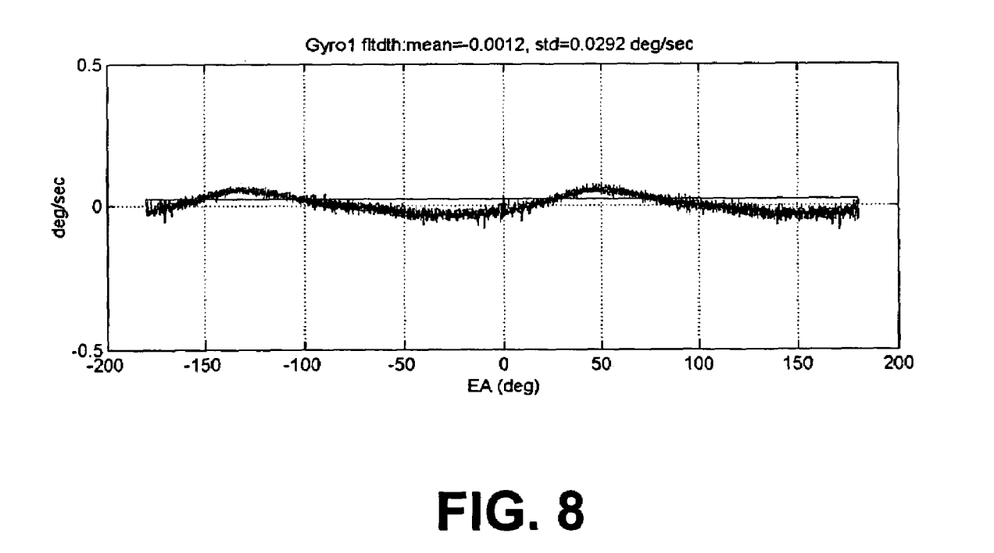
FIG. 8 depicts residual rate change with compensation.

The present method and system provides significantly improved control of the HRG. For example, FIG. 7 depicts residual rate change without compensation; and FIG. 8 depicts residual rate change with compensation. For the transition from WA to FR mode (slewing, recapture), the rate drive is turned full on (its voltage amplitude is held constant at its maximum value). The difficulty is that the phase of this large slewing voltage is not controllable enough open loop to insure that the nodal-quadrature amplitude it introduces can be dealt with by the quadrature-control loop. The simplest solution according to the present apparatus and method is to feed back the Nodal Sine gyro output (414 in FIG. 4) to a loop that controls the phase of the slewing voltage in such a way as to drive the Nodal Sine signal to zero (or at least to a minimum).

The apparatus 100 in one example comprises a plurality of components such as one or more of electronic components, hardware components, and computer software components. A number of such components can be combined or divided in the apparatus 100.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
   a vibrating rotation sensor having a rotationally symmetric thin-walled resonator which is capable of vibrating in at least one of a plurality of standing-wave modes, an orientation of a standing-wave with respect to a sequence point on the resonator being specified by a pattern angle; and
   a closed-loop slewing-voltage phase control that reduces quadrature error when the vibrating rotation sensor transitions from Whole Angle (WA) to Force to Rebalance (FTR), wherein errors in a rate command phase are corrected with use of an open-loop compensation model, and wherein the closed-loop slewing-voltage phase control is only used to correct errors in the open-loop compensation model.

2. The apparatus according to claim 1, wherein the closed-loop slewing-voltage phase control is off during the FTR and once inertial angular rate of the rotation sensor falls within the FTR capability after a high angular rate period of the rotation sensor.

3. The apparatus according to claim 1, wherein rate command phase error is minimized by dynamic closed-loop control, an output of the dynamic closed-loop control being used to estimate an optimal rate phase value to be applied by an open-loop compensation model.

4. An apparatus, comprising:

a hemispherical resonator gyro (HRG);

digital control loop algorithms which operate in two, distinct modes, Force to Rebalance (FTR) and Whole Angle (WA); and a closed-loop slewing-voltage phase control that reduces quadrature error when the hemispherical resonator gyro transitions from the WA to the FTR wherein errors in a rate command phase are corrected with use of an open-loop compensation model, and wherein the closed-loop slewing-voltage phase control is only used to correct errors in the open-loop compensation model.

5. The apparatus according to claim 4, wherein the closed-loop slewing-voltage phase control is off during the FTR and once inertial angular rate of the hemispherical resonator gyro falls within the FTR capability after a high angular rate period of the hemispherical resonator gyro.

6. The apparatus according to claim 4, wherein rate command phase error is minimized by dynamic closed-loop control, an output of dynamic closed-loop control being used to estimate an optimal rate phase value to be applied by an open-loop compensation model.

7. A method, comprising:

developing a standing wave on a quartz shell of a hemispherical resonator gyro (HRG) with a high Q resonant mode;

allowing, in open loop operation (Whole Angle Mode), the standing wave to precess freely;

recovering rebalance operation when rate drive slews a standing wave pattern; and holding, in closed loop operation (Force to Rebalance), the standing wave to null position, wherein errors in a rate command phase are corrected with use of an open-loop compensation model, and wherein the closed-loop slewing-voltage phase control is only used to correct errors in the open-loop compensation model.

8. The method according to claim 7, wherein a standing wave is developed on the quartz shell of the HRG with a high Q resonant mode.

9. The method according to claim 7, wherein the method further comprises use of a phase lock loop, which is a feedback loop, which detects and converges on a unique resonant frequency and phase of the HRG.

10. The method according to claim 7, wherein an output of the control loop generates a specific frequency control to digital signal processing which maintains a correct rate and phase of nodal and antinodal sampling.

11. An apparatus, comprising:

a hemispherical resonator gyro (HRG);

digital control loop algorithms which operate in two, distinct modes. Force to Rebalance (FTR) and Whole Angle (WA); and a closed-loop slewing-voltage phase control in which a nodal sine gyro output is fed back to a loop that controls a phase of a slewing voltage such that an nodal sine signal is driven to a minimum value, wherein errors in rate command phase are corrected with use of an open-loop compensation model, and wherein the closed-loop slewing-voltage phase control is only used to correct errors in the open-loop compensation model.

12. The apparatus according to claim 11, wherein the minimum value is zero.

13. The apparatus according to claim 11, wherein the closed-loop slewing-voltage phase control is off during the FTR and once inertial angular rate of the hemispherical resonator gyro falls within the FTR capability after a high angular rate period of the hemispherical resonator gyro.

14. The apparatus according to claim 11, wherein rate command phase error is minimized by dynamic closed-loop control, an output of the dynamic closed-loop control being used to estimate an optimal rate phase value to be applied by an open-loop compensation model.

* * * * *